3,035,083
PREPARATION OF BORON ALKYLS
Herbert Jenkner, Hannover-Wulfel, Germany, assignor to Kali-Chemie Aktiengesellschaft, Hannover, Germany
No Drawing. Filed Mar. 29, 1957, Ser. No. 649,325
Claims priority, application Germany Mar. 31, 1956
10 Claims. (Cl. 260—462)

The invention relates to the preparation of alkyl borons.

I have found that alkyl borons are obtained in almost quantitative yield by reacting boric acid esters or substituted boric acid esters with aluminum alkyls, preferably aluminum trialkyls or etherates thereof. The reaction may be carried out at room or elevated temperature.

The boron compounds suitable for the reaction may be represented by the formula

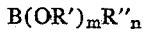

$$B(OR')_m R''_n$$

wherein R' is a hydrocarbon radical which may be substituted by an inorganic group such as halogen, $NO_2$ and others, R'' is also a hydrocarbon radical similar to R or halogen, $m=1-3$, $n=0-2$, and $m+n=3$. In addition to the trialkyl or triaryl esters of boric acid, suitable compounds are, for instance, $B(OR')_2R''$; $B(OR')_2CH_2F$; $B(OCH_2Cl)_2R''$; $B(OC_6H_4NO_2)_2R''$; $B(OR')Cl_2$, and others. These compounds comprise organic esters of boric acid, organic esters of boronic and borinic acids, which latter two may also be called alkoxy, alkyl or aryl borines; also halogen alkoxy borines, and halogen or nitro substitution products of said compounds.

The reaction, for instance for the preparation of boron trialkyls, is represented by the equation

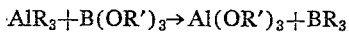

$$AlR_3 + B(OR')_3 \rightarrow Al(OR')_3 + BR_3$$

wherein R stands for an alkyl, or substituted alkyl groups, and R' is the same as above. For this reaction, it is of advantage to apply $AlR_3$ in an excess of about 5 to 20 percent over the stoichiometric amount.

The reaction proceeds in steps; intermediate aluminum compounds are $Al(OR')R_2$ and $Al(OR')_2R$, and intermediate boron compounds are $B(OR')_2R$ and $B(OR')R_2$, which can be intercepted.

For instance, if it is desired to prepare the compound $B(OR)_2R'$, the starting materials may be reacted in the proportion

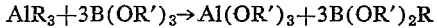

$$AlR_3 + 3B(OR')_3 \rightarrow Al(OR')_3 + 3B(OR')_2R$$

Aluminum alkyls are now readily available, and their use in the preparation of boron alkyls eliminates the need for a careful fractionation of the obtained boron alkyls as the latter are readily separated from the aluminum alcoholates or alkyl aluminum alkoxides. In the reaction of methyl borate with trialkyl aluminum, for instance, the obtained boron triethyl can be separated from the precipitated solid aluminum methoxide by centrifuging, dissolving, filtration, or distillation. If ethyl borate is used, whereby aluminum ethoxide is obtained, the preferred separation procedure will be to distill off the boron trialkyl, particularly because the aluminum ethoxide is fusible and has a melting point which is about 200° C. higher than the boiling point of the boron trialkyl. Similar separation procedures may be applied in reactions with higher boric esters.

The reaction is exothermic and may be carried out at temperatures between about 0° and 250° C. If large batches are used, it may be necessary to apply cooling. For the same purpose, it may be useful in certain cases to add solvents or diluents. In addition to the boron alkyls themselves, suitable solvents or diluents are hydrocarbons, such as propane, hexane, octane, decane, benzene, methyl naphthalene; mineral oils; methylene chloride; silicon tetraethyl, and others. The reaction may be carried out in a closed system under pressure, particularly if very volatile boron alkyls, such as boron trimethyl, are prepared.

Particularly suitable boric acid esters are alkyl esters, such as the methyl, ethyl, propyl, iso-propyl ester, the butyl esters, decyl esters, and also aryl esters, like phenyl ester.

The following examples are given to illustrate the invention. All parts are given by weight, unless indicated otherwise.

Example 1

26.8 parts of triethyl aluminum were added dropwise within 3 hours, with stirring, to 19 parts of ethyl borate. The reaction was exothermic, and was completed by refluxing for three more hours.

By distillation, boron triethyl ($b_{760}=95-96°$ C.) was obtained in a yield of about 92%.

Example 2

To 446 parts of ethyl borate, dissolved in 1000 parts of boron triethyl, there were added 349 parts of triethyl aluminum with stirring; the rate of addition was controlled, so as to maintain the exothermic reaction at a temperature of 80–90° C. Solid pure white aluminum ethoxide (502 parts) was precipitated, and boron triethyl was distilled off. In addition to the boron triethyl used as solvent, which was completely recovered, 285 parts (=95.3% of theory) of boron triethyl were obtained.

If instead of boron triethyl, methyl naphthalene, decane, or methylene chloride were used as solvent, the yield was also more than 90 percent.

Example 3

329 parts of triethyl aluminum were dropped into a solution of 600 parts of methyl borate in 1200 parts of boron triethyl, and the reaction temperature was maintained at about 80 to 90° C. Boron triethyl and the obtained ethyl borate were distilled off from the precipitate, which consisted of 351 parts of snow-white solid aluminum methoxide; into the distillate, 329 additional parts of aluminum triethyl were dropped. On distillation, a total of 1743 parts of boron triethyl was obtained. 543 parts thereof had been obtained by the reaction, corresponding to a yield of 96.1 percent.

If, instead of boron triethyl, the boric acid ester or a mixture of boric acid esters is used as solvent, there is also aluminum alkoxide precipitated on addition of aluminum trialkyl. The obtained mixture of boron trialkyl and boric ester, or the alkyl borate formed from said mixture, can be completely converted into boron trialkyl by repeated addition of aluminum triethyl.

If, instead of aluminum triethyl, aluminum trimethyl or tributyl are reacted with ethyl or methyl borate, the yields of boron trimethyl and boron tributyl, respectively, are also in excess of 90 percent.

Example 4

The same amounts and conditions were used as in Examples 2 and 3, but instead of boron triethyl, an after-hydrogenated mineral oil ($b_1$ 190–200° C.) was used as a diluent. Also, in this case, the yield of boron triethyl was above 90 percent.

Good yields of boron alkyls are also obtained if dialkyl aluminum chloride or alkyl aluminum sequichloride are used in the above reactions instead of aluminum trialkyls.

I claim:

1. A method of preparing boron trialkyls, comprising reacting a trialkyl borate with a member of the group consisting of aluminum trialkyls and etherates thereof at a temperature of about 0° to 250° C., and separating the obtained boron trialkyl from the formed aluminum alkoxide.

2. The method as defined in claim 1, wherein the retion is carried out under pressure.

3. The method as defined in claim 1, wherein the reaction is carried out in an inert organic solvent.

4. The method as defined in claim 3, wherein boron alkyl is used as a solvent.

5. The method as defined in claim 1, wherein the reaction temperature is maintained below the boiling point of the obtained boron alkyl.

6. A method of preparing an organoboron compound of the formula $B(OR')_n R_{3-n}$, wherein R is an organic radical selected from the group consisting of alkyl and haloalkyl, R' is an organic radical selected from the group consisting of alkyl, chloromethyl, phenyl, and nitrophenyl, linked through a C atom to O, $n$ is an integer between 0 and 2, comprising adding a member of the group consisting of aluminum trialkyls and etherates thereof, to a boron ester of the formula $B(OR')_n X_{3-n}$ wherein R' is defined as above, $n$ is an integer from 1 to 3 and X is selected from the group consisting of alkyl and haloalkyl, at a temperature of about 0° to 250° C. to form said organoboron compound and an aluminum alkoxide, and separating said organoboron compound from said aluminum alkoxide.

7. The method as defined in claim 6, wherein said organoboron compound is distilled off from the aluminum alkoxide.

8. The method as defined in claim 6, wherein the reaction is carried out under pressure.

9. A method of making boron trialkyls comprising reacting a tri-(lower alkyl) borate with an aluminum tri-(lower alkyl) at a temperature of about 25° C. to 250° C. and separating said boron trialkyl from the reaction mixture.

10. A method of making boron trialkyls comprising reacting a tri-(lower alkyl) borate with an aluminum tri-(lower alkyl) and separating said boron trialkyl from the reaction mixture.

References Cited in the file of this patent

F.I.A.T. Reviews of German Science (1939–46), Inorganic Chemistry, vol. I, pages 224 and 228.

Gilman: PB Report 5596, OSRD No. 871, pp. 12 to 14, declassified Jan. 28, 1946.

Coates: Organometallic Compounds, John Wiley & Sons, London, 1956, pp. 72–3.